United States Patent
Chance (10) Patent No.: US 11,376,902 B2
(45) Date of Patent: Jul. 5, 2022

(54) QUICK RELEASING HITCH PIN

(71) Applicant: Bar C Innovations LLC, Mayetta, KS (US)

(72) Inventor: Blake J. Chance, Mayetta, KS (US)

(73) Assignee: Bar C Innovations LLC, Mayetta, KS (US)

( * ) Notice: Subject to any disclaimer, the term of this patent is extended or adjusted under 35 U.S.C. 154(b) by 200 days.

(21) Appl. No.: 16/946,190

(22) Filed: Jun. 9, 2020

(65) Prior Publication Data
US 2020/0391561 A1    Dec. 17, 2020

Related U.S. Application Data (60) Provisional application No. 62/860,852, filed on Jun. 13, 2019.

(51) Int. Cl.
*B60D 1/02*      (2006.01)
*B60D 1/28*      (2006.01)

(52) U.S. Cl.
CPC ............... *B60D 1/025* (2013.01); *B60D 1/28* (2013.01)

(58) Field of Classification Search
CPC .................................. B60D 1/28; B60D 1/025
See application file for complete search history.

(56) References Cited

U.S. PATENT DOCUMENTS

| | | | | |
|---|---|---|---|---|
| 3,865,407 A | * | 2/1975 | Klassen | B60D 1/02 280/515 |
| 4,555,125 A | * | 11/1985 | Goodlove | B60D 1/02 280/515 |
| 5,921,699 A | * | 7/1999 | Olson | B60D 1/28 280/509 |
| 6,145,866 A | * | 11/2000 | Peter | B60D 1/025 403/325 |
| 8,240,696 B1 | * | 8/2012 | Miller | B60D 1/025 280/515 |
| 8,662,784 B2 | * | 3/2014 | Cocayne | B60D 1/155 403/154 |
| 9,242,519 B2 | * | 1/2016 | Terpsma | B60D 1/025 |
| 2001/0054807 A1 | * | 12/2001 | Homan | B60D 1/02 280/515 |
| 2003/0193167 A1 | * | 10/2003 | Hall | B62D 53/0828 280/511 |

FOREIGN PATENT DOCUMENTS

WO    WO-2017078971 A   *   5/2017   ............... B60D 1/02

* cited by examiner

*Primary Examiner* — Kevin Hurley
(74) *Attorney, Agent, or Firm* — Coughlin Law Office LLC; Daniel J. Coughlin; Stuart M. Aller (57) ABSTRACT

A hitch pin for quick and easy release of a hitch assembly. The hitch pin has a shaft with added hole for connection to a removable lock cap by a coupler pin. The quick releasing hitch pin device may be used to secure a hitch and hitch receiver. In addition, the combination of a removable lock cap allows the hitch pin to gravity release thereby freeing the operator to operate the vehicle with hitch in order to release a bound-up hitch pin from the hitch receiver on the draft implement. This method makes for a less cumbersome and safer release of a hitch pin in varied situations, such as when an implement is on fire risking life, limb and property.

15 Claims, 7 Drawing Sheets

QUICK RELEASING HITCH PIN

CROSS REFERENCES

This application claims the benefit of U.S. Provisional Application No. 62/860,852, filed 13 Jun. 2019.

REFERENCE TO CDS

Not Applicable.

FIELD OF THE INVENTION

This disclosure relates to hitch pins and, in particular, to a hitch pin configured to be inserted with the assistance of gravity and quickly released from a hitch assembly with the assistance of gravity.

BACKGROUND

Hitch pins join an implement to a vehicle so that they may be transported as one unit. The hitch pin is generally comprised of a shaft with a handle on one end and a hitch pin clip on the other end. Hitch pins are used to join an implement to a vehicle by inserting the hitch pin into the hitch orifice to interlock the hitch on the implement to the hitch receiver on the vehicle. Once the hitch pin has been inserted through the hitch orifice in the hitch and the hitch receiver, then the hitch pin clip is inserted into a securing orifice on the shaft to keep the hitch pin in place during transport.

Hitch pins are found, for example, on many vehicles equipped with receiver style hitch assemblies mounted to the undercarriage of a vehicle such as on farms for connecting draw vehicles such as tractors to draft implements such as balers. Conventional hitch pins for securing a hitch to a hitch receiver rely on a handled hitch pin and clip to physically secure the hitch assembly together. Conventional hitch pins are released from the hitch assembly by releasing the clip and pulling the hitch pin up and out of the assembly which continues to be a problem and holds disadvantages.

SUMMARY

Hitch pins tend to bind, making removing the hitch pin from the top difficult. That means hitch pins are not quickly removable. In order to unbind conventional hitch pins, an operator may have to move the vehicle to a more level surface to prevent the horizontal pressure that binds the pin. Alternatively, the operator may have to beat on a lower portion of the conventional hitch pins with a hammer or whatever hammer-like tool may be readily accessible. The inventor recognized the disadvantage of trying to precisely line up the hitch and hitch receiver to unbind the pressure between the shaft and hitch assembly before pulling the hitch pin up. This binding of hitch pins results in frustration, loss of time, or in the case of an implement fire, the loss of property other than the implement alone and danger to the operator.

Operators have attempted to solve this problem by inserting a conventional hitch pin upside down, so the handle is oriented at the bottom of the shaft and the shaft is inserted upwardly through the hitch orifice hitch and the hitch receiver. This orientation of conventional hitch pins allows gravity to release the shaft once pressure on the shaft was released by the operator. The inventor recognized that this too is inefficient. Instead of being inconvenient during the disconnecting of the hitch from the hitch receiver, this method of using a conventional hitch pin is inconvenient during hook up. The operator must insert the hitch pin upside down into a hitch assembly while holding the hitch receiver in addition to inserting the hitch pin clip to keep the hitch pin in place against the force of gravity during installation. Such a method solved a part of a problem but resulted in other problems and did not allow for a quick, easy, one-person hook up and disconnect.

In accordance with the current disclosure, the problem of releasing a hitch pin quickly is solved by disconnecting a coupler pin on the lock cap of a hitch pin. This allows gravity to pull the shaft down and out of the hitch assembly as pressure is released on the shaft while disconnecting an implement. In this way, a single operator can remove the coupler pin, then move the draw vehicle. As soon as the operator moves the draw vehicle enough to release the horizontal binding pressure, the hitch pin drops under the assistance of gravity.

Some of the advantages of the current disclosure detailed below can be implemented independently of others and include:

a. In accordance with the current disclosure, a lock cap with coupler pin allows quick release of the hitch pin. Any coupler pin may connect the lock cap to the pin shaft such as a cotter pin, a bolt with nut, safety pin, safety lock pin, locking pin, coupler safety pin, and safety clip.

b. A lock cap with diameter larger than hitch assembly orifice to prevent hitch pin from falling through the hitch assembly.

c. In one embodiment, the safety latch on the coupler pin may be interlocked with the hitch pin handle to prevent the safety latch from becoming dislodged during transport or becoming pinched within the hitch assembly during installation.

d. A removable handle for ease of installation, removal and portability.

e. In one embodiment, the shaft is made from heat treated steel for durability.

f. A beveled or tapered end of shaft for ease of installation into hitch assembly.

g. Zinc-plated or powder-coated finish to prevent rust and provide aesthetics.

h. In another embodiment, the coupler pin may entirely replace the handle and lock cap, such as when used with heavier applications.

i. In another embodiment, the bridge or cotter key can be eliminated when the rod of the coupler pin comprises a slot for retention of the wire safety latch.

BRIEF DESCRIPTION OF DRAWINGS

Aspects are illustrated by way of example, and not by way of limitation, in the accompanying drawings, wherein.

DETAILED DESCRIPTION

Figure 1:
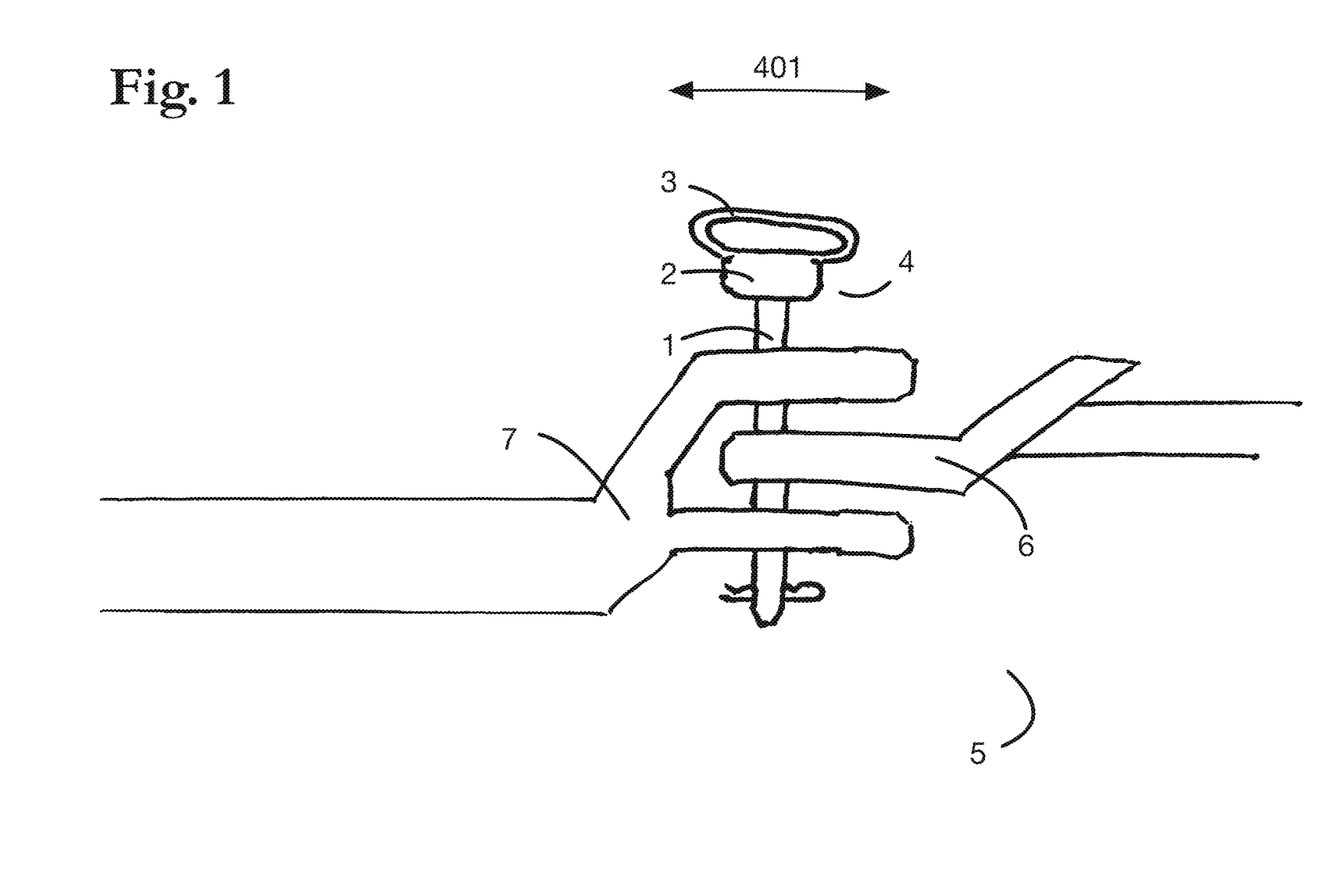
FIG. 1 depicts a hitch and hitch receiver fixed in place with respect to one another with a hitch pin in an inserted position.

An example hitch pin is illustrated in FIG. 1 in the inserted position. The FIG. 1 device comprises: a cylindrical metal shaft 1 with distal transverse orifice to receive a hitch pin clip; a welded cap 2 having a metal handle 3 for pulling the hitch pin up and out of the hitch assembly 5. The hitch pin of FIG. 1 shows a handle integrally formed with the shaft and is not easily removed from a hitch assembly 5 due to the horizontal binding force shown by arrow 401 between the hitch 6 and hitch receiver 7.

Figure 2:
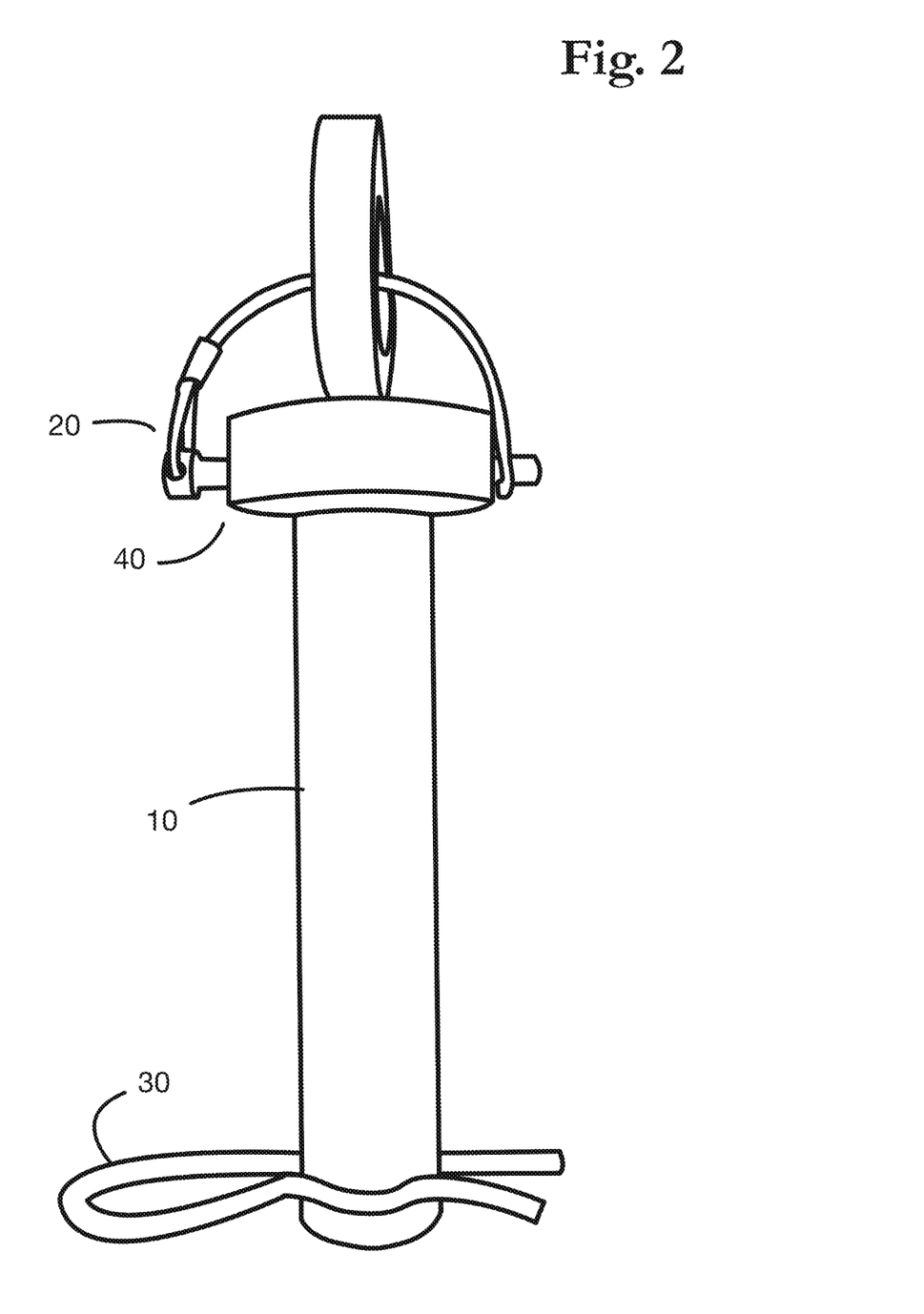
FIG. 2 depicts an assembled hitch pin with removeable locking cap.
Figure 3:
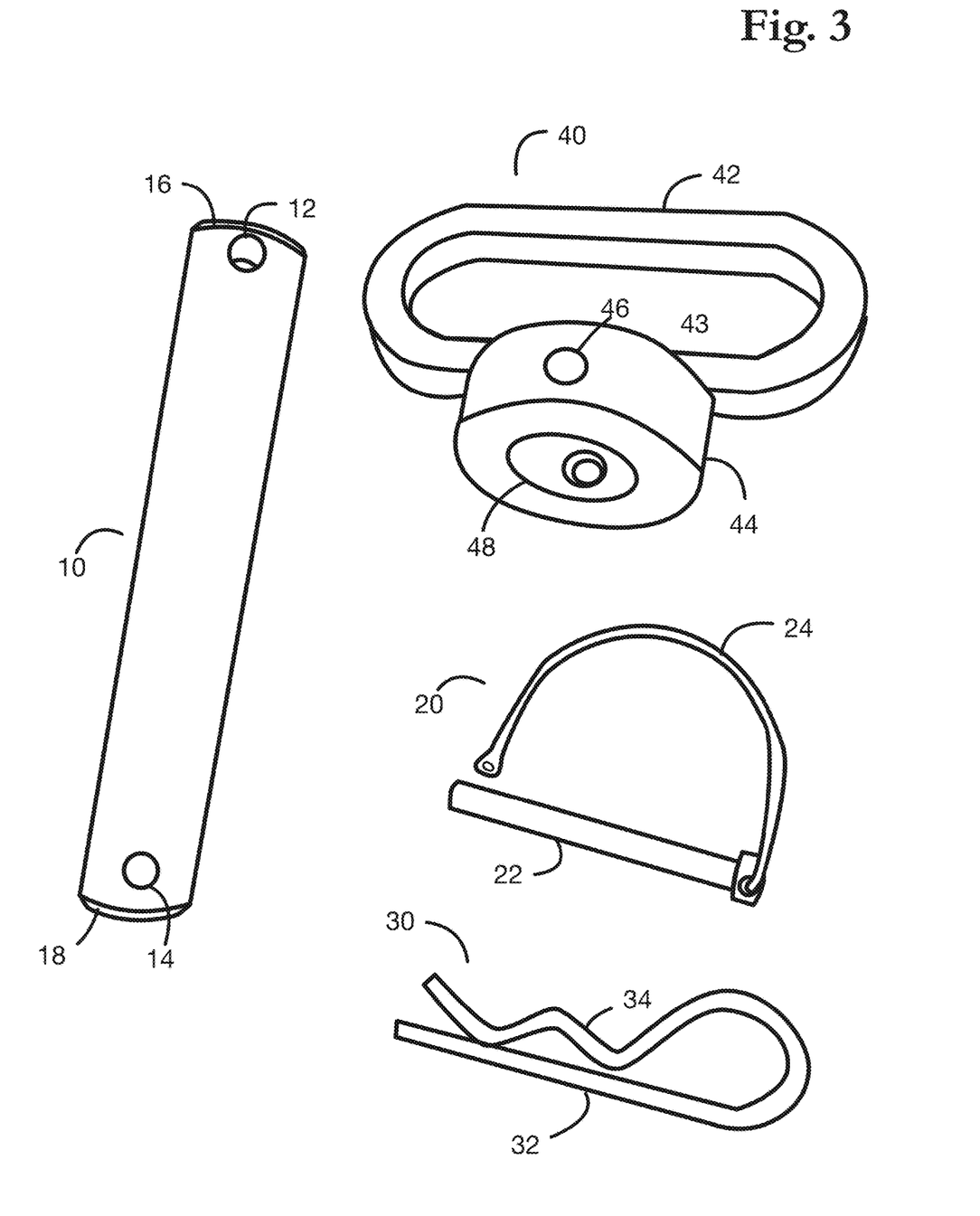
FIG. 3 depicts a hitch pin with the locking cap decoupled from the shaft.
Figure 4:
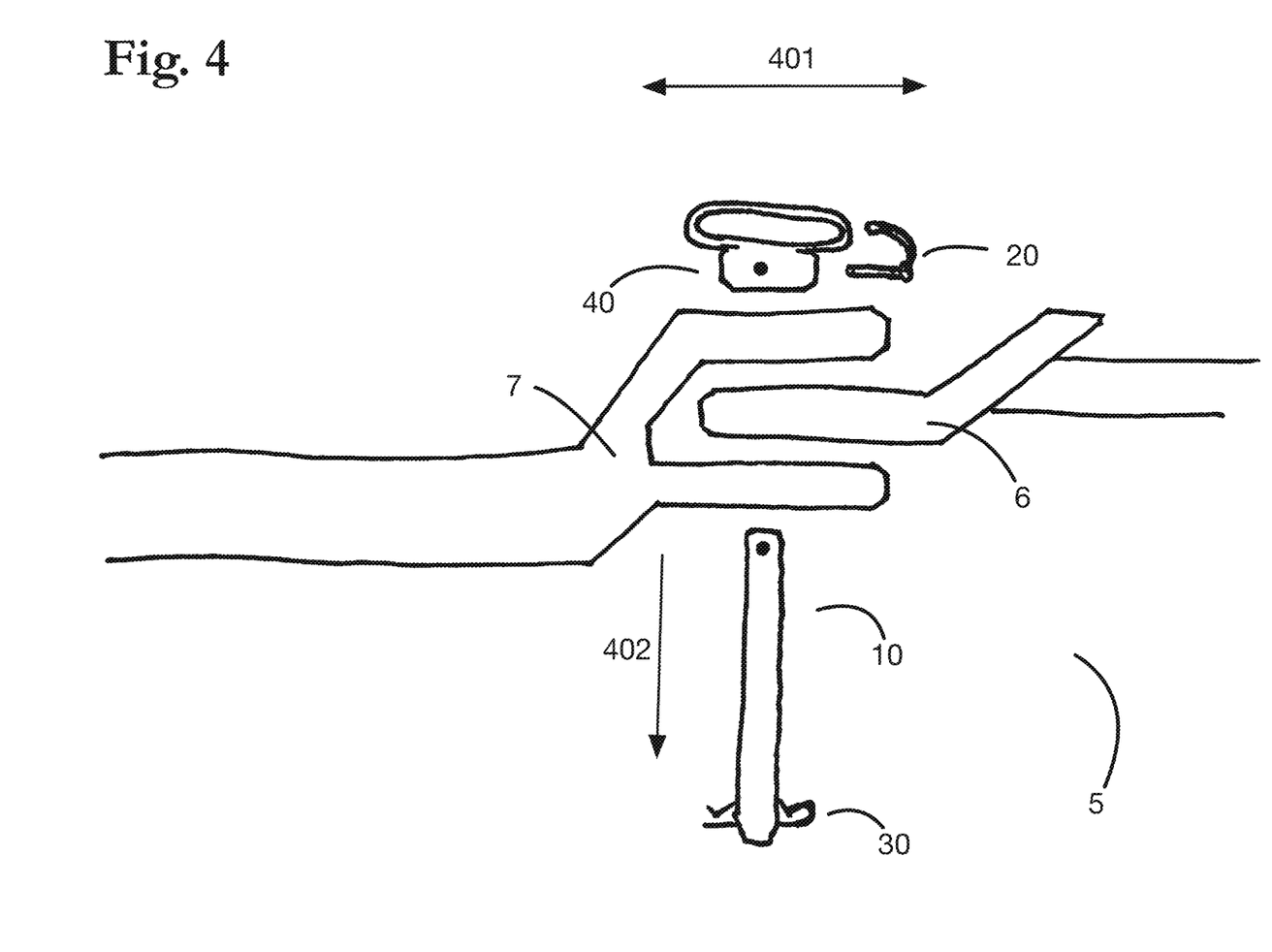
FIG. 4 depicts a hitch and hitch receiver being disconnected from one another and the hitch pin of FIG. 2 with the locking cap decoupled from the shaft in a released position.

Details of the current disclosure are susceptible to embodiment in many different forms, but one embodiment is shown in FIGS. 2, 3, and 4, and will be described herein in detail. Specific embodiments are made with the understanding that the current disclosure is to be considered as an exemplification of the principles of the disclosure and is not to be limited to the specific embodiments described.

FIG. 2 depicts a securing device, or hitch pin, with the assembly of shaft 10, coupler pin 20, and handle assembly 40, that is more easily and quickly released than those known in the prior art.

FIG. 3 depicts an embodiment of the hitch pin disassembled. The current disclosure comprises a cylindrical metal rod, or shaft 10. The shaft may be between ½" to ¼" in diameter, but this size may vary depending on the application. The shaft would be sized to pass through the orifice in the hitch and receiver hitch while having enough strength to overcome any sheer force between the hitch and the receiver hitch. The shaft has a upper end 16 that is tapered. Cavity 48 of the lock cap 44 is placed near the upper end 16. The lock cap 44 is rotated to align locking orifice 46 with upper orifice 12 on shaft 10 transversely, thereby forming a passageway through the shaft 10 and lock cap 44. The inventor has discovered that by placing the rod 22 of a coupler pin 20 through orifices 12 and 46 that shaft 10 and lock cap 44 can be made to interlock together. Any coupler pin may connect the lock cap 44 to the pin shaft 10 such as a cotter pin, a bolt with nut, safety pin, safety lock pin, locking pin, coupler safety pin, and safety clip. Upon removal of rod 22, the shaft 10 is released by gravity thereby quickly unhitching the implement from the vehicle.

As shown in FIG. 4, a single operator can use the hitch pin of the current disclosure to quickly and easily release the hitch 6 from a hitch receiver 7. The hitch 6 and hitch receiver 7 are fixed in place with respect to one another with the hitch clip pin 30 remaining installed through the lower portion of the shaft 10. An operator unlatches the two-wire safety latch 24 on the coupler pin 20. The operator then pulls coupler pin 20 from the lock cap 44. This allows shaft 10 to fall in the direction of arrow 402 under the assistance of gravity through the hitch assembly 5 without further operator intervention when the shaft is not bound between the hitch 6 and the hitch receiver 7. If the horizontal binding force, shown by arrow 401, causes pressure on the hitch pin, the operator may then move the draw vehicle to unbind the hitch pin. This allows the bound hitch pin to be more easily removed by a single operator, instead of requiring the operator to make repeated adjustments of the draw vehicle to release the horizontal binding force on shaft 10 or to exert blows upon the hitch pin with a hammer or other blunt instrument.

In order to securely couple an implement to a draw vehicle, the hitch 6 and hitch receiver 7 are secured with a shaft 10 connected to a larger diameter lock cap 44 with handle 42 by a coupler pin 20. The shaft 10 with tapered lower end 18 is inserted through first hitch receiver orifice (not shown) of implement, then through hitch orifice (not shown) of vehicle, and then beyond the confines of the second hitch receiver orifice (not shown) of implement. The straight leg 32 of hitch clip pin 30 is then passed through lower orifice 14 on shaft 10 while second leg 34 of hitch clip pin 30 overlaps shaft 10 creating a tensional bind to hold hitch pin clip 30 in place. Any hitch clip pin type may be used such as a cotter pin, a bolt with nut, safety pin, safety lock pin, locking pin, coupler safety pin, and safety clip. This prevents the hitch pin from coming out of the hitch assembly 5.

Figure 5:
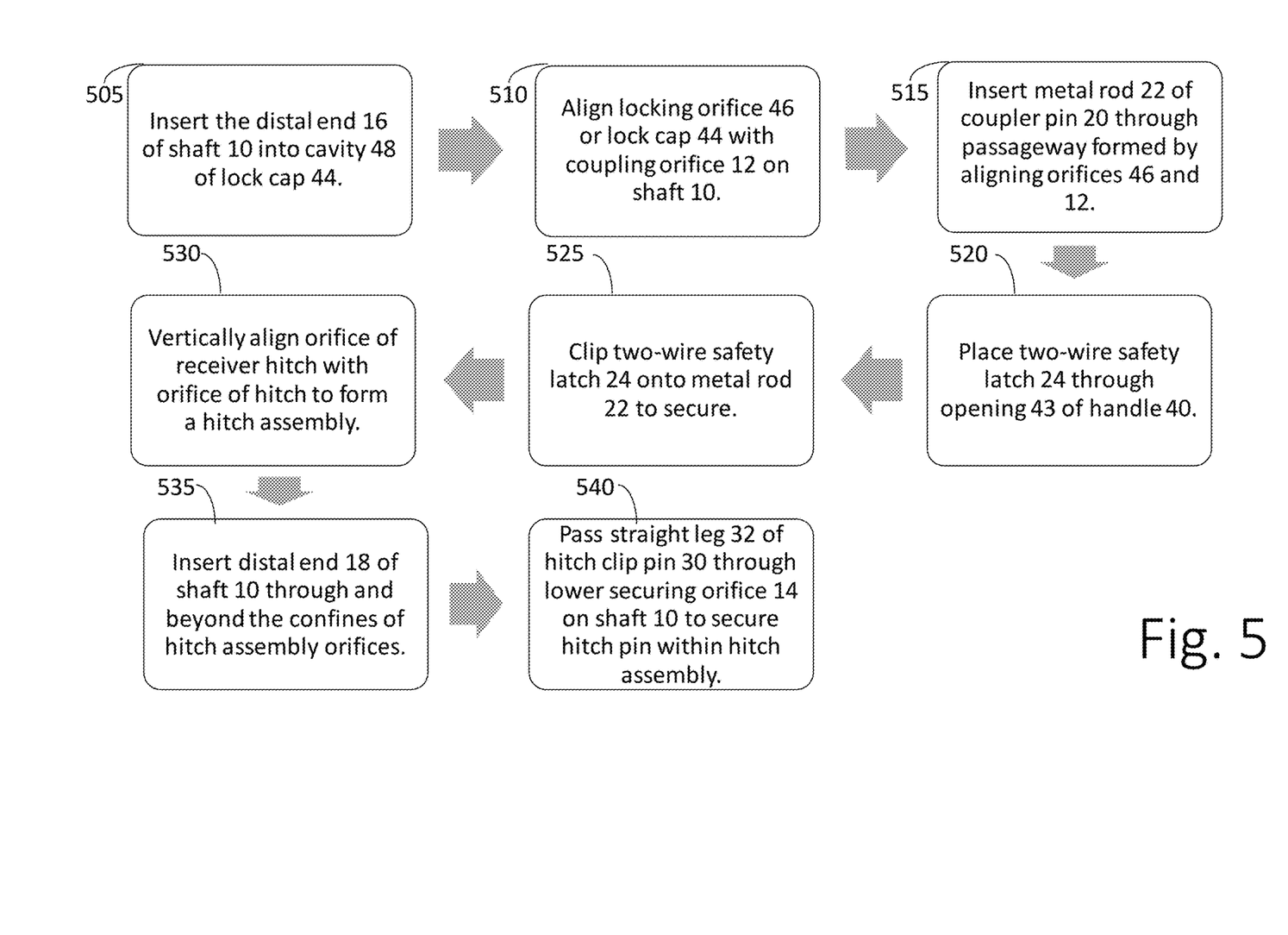
FIG. 5 depicts a flow chart for installing a hitch pin of FIG. 3.

A method for installing the hitch pin with the removable locking cap by a single operator is shown in FIG. 5. As shown in step 505, insert the upper end 16 of shaft 10 into cavity 48 of lock cap 44. As shown in step 510, align locking orifice 46 or lock cap 44 with upper orifice 12 on shaft 10. As shown in step 515, insert rod 22 of coupler pin 20 through passageway formed by aligning orifices 46 and 12. As shown in step 520, place the two-wire safety latch 24 through opening 43 of handle 42. As shown in step 525, clip two-wire safety latch 24 onto metal rod 22 to secure. As shown in step 530, vertically align orifice of receiver hitch 7 with orifice of hitch 6 to form a hitch assembly 5. As shown in step 535, insert lower end 18 of shaft 10 through and beyond the confines of hitch assembly orifices. As shown in step 540, pass straight leg 32 of hitch clip pin 30 through lower orifice 14 on shaft 10 to secure hitch pin within hitch assembly 5.

Figure 6:
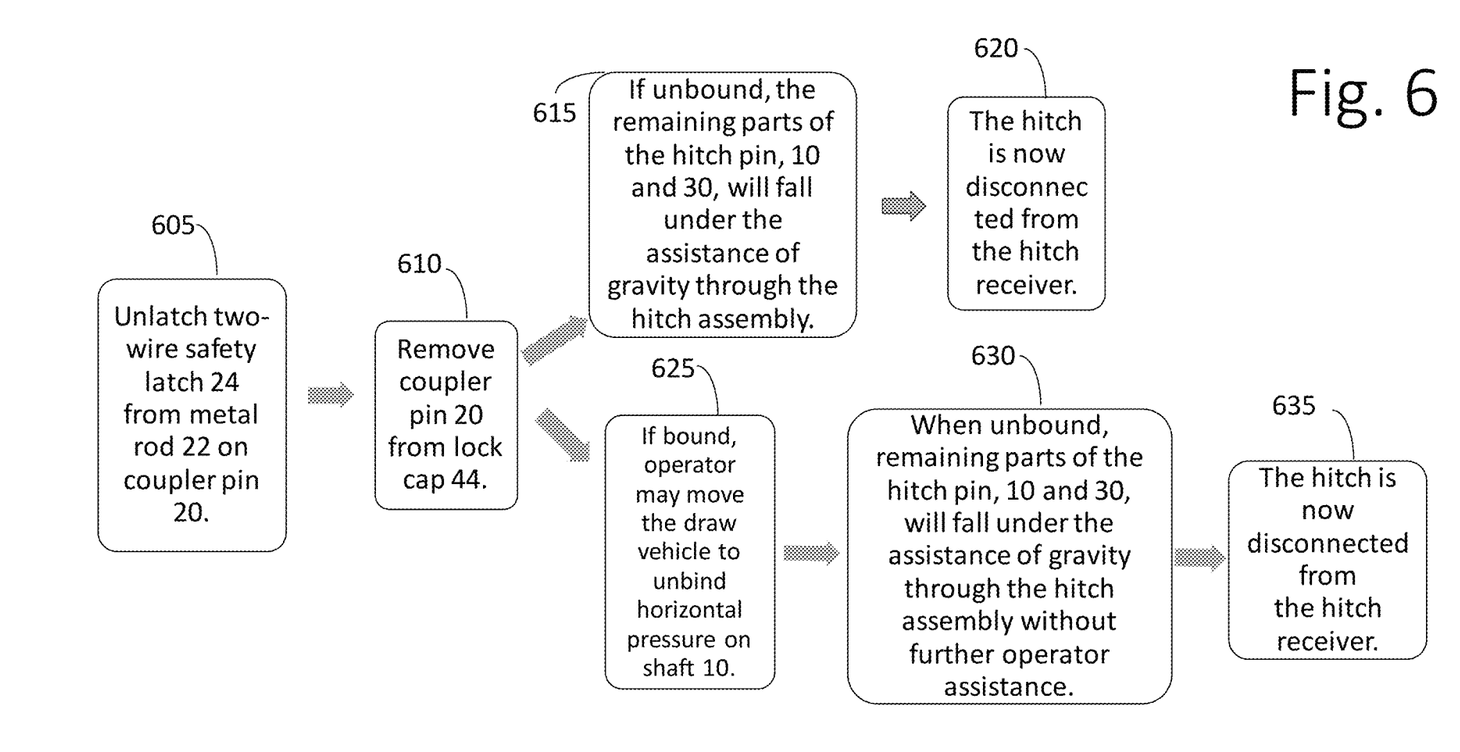
FIG. 6 depicts a flow chart for disconnecting a hitch pin of FIG. 2.

A method for disconnecting a hitch pin with the removable locking cap by a single operator is shown in FIG. 6. As shown in step 605, unlatch the two-wire safety latch 24 from metal rod 22 on coupler pin 20. As shown in step 610, remove coupler pin 20 from lock cap 44. As shown in possible step 615, allow remaining parts of hitch pin, shaft 10 and hitch clip pin 30, to fall under the assistance of gravity 402 through the hitch assembly 5. As shown in step 620, disconnect the hitch 6 from the hitch receiver 7. As shown in possible step 625, the operator may need to move the draw vehicle to unbind the horizontal binding force 401 on shaft 10. As shown in step 630, allow remaining parts of the hitch pin, shaft 10 and hitch clip pin 30, to fall under the assistance of gravity 402 through the hitch assembly 5 without further operator assistance. As shown in step 635, disconnect the hitch 6 from the hitch receiver 7 by moving the draw vehicle. The steps of this method shown in FIG. 6 are also functional for releasing a hitch assembly that is bound under a horizontal binding force.

As shown in FIG. 2, the two-wire safety latch 24 of coupler pin 20, upon installation of the hitch pin into the hitch assembly 5, may then be placed through opening 43 of handle 42 to prevent the two-wire safety latch 24 from releasing coupler pin 20. Another advantage of said step is to prevent the two-wire safety latch 24 from being pinched between the hitch 6 and hitch receiver 7 when the hitch pin is installed in the hitch assembly 5.

In accordance with an advantageous feature of the current disclosure, the hitch pin becomes portable by handle assembly 40 when picked up by handle 42 with opening 43. Handle 42 also gives the advantage of making easier installations.

A hitch pin can be made from any desired material having enough strength to secure the hitch assembly. For example, heat treated steel, is sufficiently durable and flexible for the intended application.

Figure 7:
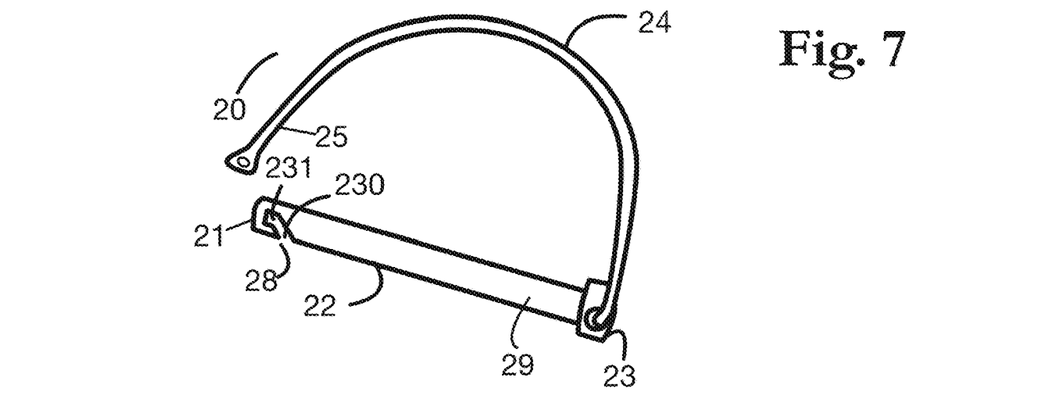
FIG. 7 depicts the coupler pin for interlocking the hitch pin shaft and lock cap with an outward spring force.
Figure 8:
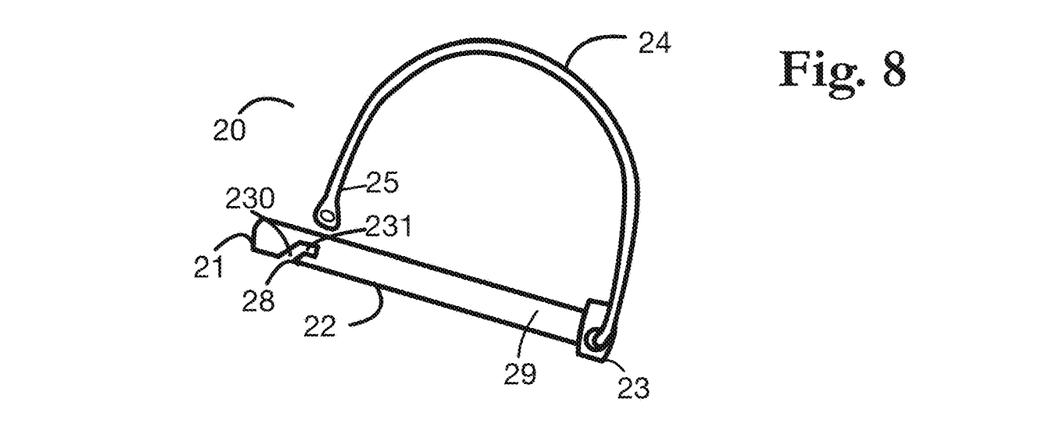
FIG. 8 depicts the coupler pin for interlocking the hitch pin shaft and lock cap with an inward spring force.
Figure 9:
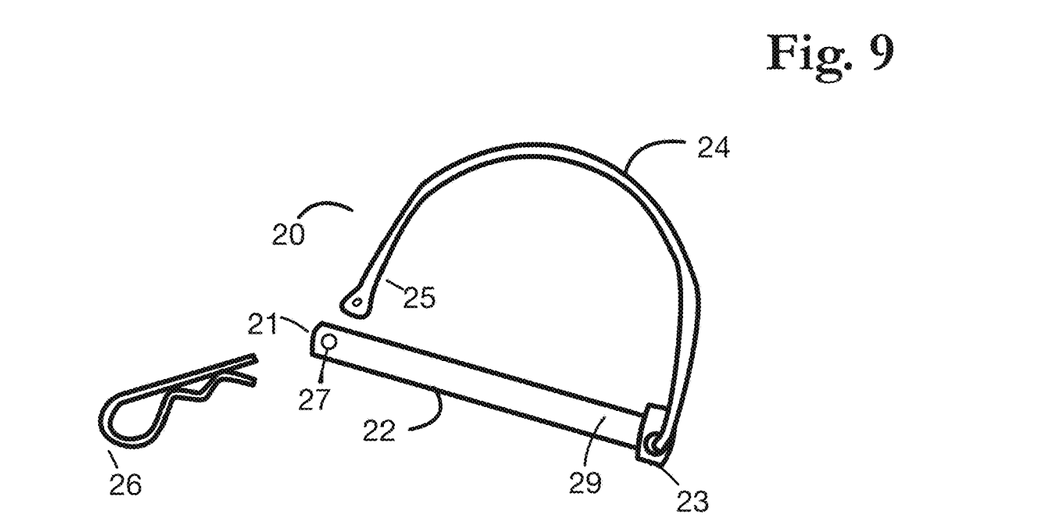
FIG. 9 depicts the coupler pin for interlocking the hitch pin shaft and lock cap with a bridge key.

A hitch pin device can utilize a plurality of coupler pin 20 designs to increase safety when securing the coupler pin 20 with the hitch pin device. FIGS. 7, 8 and 9 depict a plurality of designs for retaining the wire safety latch 24 of the coupler pin 20. As shown in FIG. 9, the wire safety latch 24 on the coupler pin 20 is pivotally moveable on a pivot end 23 of the rod 22. The wire safety latch 24 engages a free end 21 of the rod 22. A bridge key 26 is inserted through a bridge key orifice 27 on the free end 21 of the rod 22 when the wire safety latch 24 is retained by the free end 21 of the coupler pin 20. Alternatively, to eliminate the need for a bridge key 26, the rod 22 of the coupler pin 20 may comprise a slot 28 that extends into the rod 22 radially near the free end 21. The slot 28 path extends into the rod 22 longitudinally between an outer radial rod portion and an inner radial rod portion of the rod 22. A lock end 25 of the wire safety latch 24 is configured to be retained by the slot 28 after the hitch pin is installed in the hitch assembly 5. The wire safety latch 24 may be configured to be retained by the slot 28 with an outward spring force, as shown in FIG. 7, or an inward spring force, as shown in FIG. 8. The wire safety latch 24 may be inward or outward spring force depending on whether a first rod length measured between the first end and the slot is longer or shorter than the first wire safety latch length measured between the pivot end and the lock end of the wire safety latch in an uncompressed state. A slot entrance 230 extends into the rod radially near the free end 21. A slot path 231 extends into the rod longitudinally between the outer radial rod portion and the inner radial rod portion. The slot path 231 extends into the rod 22 longitudinally toward the free end 21 when the first rod length is less than the first wire safety latch length. The slot path 231 extends into the rod 22 longitudinally toward the first end 29 when the first rod length is greater than the first wire safety latch length.

A hitch pin can be modified for varied applications, such as with heavier equipment, to eliminate the lock cap 44 when individually using the coupler pin 20 as a type of hammer strap. In this configuration, the wire safety latch 24 of the coupler pin 20 functions as a handle and the coupler pin 20 replaces the lock cap. In one embodiment, the rod 22 of the coupler pin 20 may be ½" in diameter. In another embodiment, the rod 22 of the coupler pin 20 may be ¾" in diameter, but this size may vary depending on the application. The rod 22 is placed through the upper orifice 12 on the upper end 16 of the shaft 10 of the hitch pin. In one embodiment, the shaft 10 of the hitch pin may be equal to 2" in diameter. In another embodiment, the shaft 10 of the hitch pin may be less than or greater than 2" in diameter, as this size may vary for lighter or heavier applications. The wire safety latch 24 of the coupler pin 20 is then pivotally mounted at the first end of the rod 22 and secured using one of the plurality of designs shown in FIGS. 7, 8 and 9.

I claim:
1. A hitch pin assembly comprising:
   a. a shaft comprising:
      i. an upper orifice;
      ii. a lower orifice;
   b. a handle assembly having a locking orifice:
   c. a coupler pin inserted into the locking orifice and the upper orifice, wherein the handle assembly is mounted to the shaft; and
   d. wherein the shaft is configured to drop through a hitch assembly under the force of gravity when the coupler pin is removed from the locking orifice and the upper orifice.
2. The hitch pin assembly of claim 1, further comprising:
   a. a hitch clip pin inserted into the lower orifice; and
   b. wherein the shaft is configured to drop under the force of gravity while the hitch clip pin is retained in the lower orifice.
3. The hitch pin assembly of claim 1, wherein the shaft is further configured to drop under the force of gravity when the coupler pin is removed from the upper orifice and a binding force is removed by moving a draw vehicle relative to an implement.
4. The hitch pin assembly of claim 1, further comprising:
   a. a hitch clip pin inserted into the lower orifice; and
   b. wherein the hitch pin assembly is further configured to allow the shaft to be installed from a top of the hitch assembly when the hitch clip pin is removed from the lower orifice.
5. The hitch pin assembly of claim 1, wherein the coupler pin further comprises:
   a. a wire safety latch configured to retain the coupler pin in the upper orifice.
6. The hitch pin assembly of claim 5, wherein the wire safety latch is configured to form a handle.
7. A hitch pin assembly comprising:
   a. a shaft comprising:
      i. an upper orifice;
      ii. a lower orifice;
   b. a lock cap comprising:
      i. a locking orifice;
      ii. a cavity operable to receive the shaft and align the locking orifice and the upper orifice; and
   c. a coupler pin inserted through the locking orifice and the upper orifice.
8. The hitch pin assembly of claim 7, wherein the lock cap further comprises:
   a. a handle extending on a side opposite the cavity.
9. The hitch pin assembly of claim 8, wherein the coupler pin further comprises:
   a. a rod comprising:
      i. a first end;
      ii. a free end;
   b. a wire safety latch comprising:
      i. a pivot end pivotally mounted at the first end of the rod;
      ii. a lock end; and
   c. wherein the wire safety latch is configured to pass through the handle to engage the free end of the rod thereby retaining the coupler pin in the upper orifice.
10. The hitch pin assembly of claim 7, wherein the shaft further comprises:
    a. an upper end that is tapered; and
    b. a lower end that is tapered and opposite the upper end.
11. A method for releasing a hitch assembly bound by a horizontal binding force, the method comprising the steps of:
    a. inserting a shaft into a lock cap, the shaft having an upper orifice;
    b. aligning the upper orifice with a locking orifice disposed through the lock cap;

c. inserting a coupler pin through the upper orifice of the shaft and the locking orifice of the lock cap;
d. coupling the hitch assembly with the shaft inserted through the hitch assembly from above, the shaft having the coupler pin inserted through the upper orifice of the shaft;
e. removing the coupler pin from the shaft; and
a. moving a draw vehicle thereby releasing the horizontal binding force and allowing the shaft to fall under the force of gravity.

12. The method of claim 11, wherein the coupler pin comprises a wire safety latch, the wire safety latch is inserted through a handle of the lock cap.

13. The method of claim 11, further comprising the step of:
a. after the step of inserting the coupler pin through the upper orifice and the locking orifice, securing the coupler pin through the upper orifice and the locking orifice by passing a wire safety latch through a handle of the lock cap and retaining the wire safety latch onto a free end of the coupler pin.

14. The method of claim 11, further comprising the step of:
a. after the step of inserting the coupler pin through the upper orifice and the locking orifice, securing the coupler pin through the upper orifice and the locking orifice by retaining a wire safety latch onto a free end of the coupler pin.

15. The method of claim 11, wherein prior to the step of removing the coupler pin from the shaft, the method comprises:
a. unlatching a wire safety latch from a free end of the coupler pin.

\* \* \* \* \*